United States Patent [19]

Bedard et al.

[11] E Re. 31,470

[45] Reissued Dec. 20, 1983

[54] STRIPLINE FILTER DEVICE

[75] Inventors: Brian E. Bedard, Tamarac; Bertho K. Boman, Fort Lauderdale, both of Fla.

[73] Assignee: Motorola, Inc., Schaumburg, Ill.

[21] Appl. No.: 375,433

[22] Filed: May 6, 1982

Related U.S. Patent Documents

Reissue of:

[64] Patent No.: 4,266,206
Issued: May 5, 1981
Appl. No.: 938,564
Filed: Aug. 31, 1978

[51] Int. Cl.[3] ..... H01P 2/03; H01P 7/08

[52] U.S. Cl. ..... 333/204; 333/203; 333/246; 333/219

[58] Field of Search ..... 333/202–205, 333/245–246, 219–225

[56] References Cited

U.S. PATENT DOCUMENTS

| | | | |
|---|---|---|---|
| 3,327,255 | 6/1967 | Bolljahn et al. | 333/203 |
| 3,451,015 | 6/1969 | Heath | 333/203 |
| 3,534,301 | 10/1970 | Golembeski | 333/204 |
| 3,805,198 | 4/1974 | Gewartowski et al. | 333/204 |
| 4,129,842 | 12/1978 | Torii et al. | 333/204 X |

OTHER PUBLICATIONS

Milligan, "Dimensions of Microstrip Coupled Lines & Interdigital Structures", IEEE Trans MTT, May 1977, pp. 405–410.

Fjerstad, "Synchronously Tunable Multisection, Narrowband Rejection Filters", The Microwave Journal, Oct. 1965, pp. 36–40.

Cristal, "Tapped-Line Coupled Transmission Lines with Appl. to Interdigital & Combline Filters", IEEE Trans MTT, Dec. 1975, pp. 1007–1012.

*Primary Examiner*—Marvin L. Nussbaum

*Attorney, Agent, or Firm*—Rolland R. Hackbart; James W. Gillman

[57] ABSTRACT

Stripline filters and the like have one or more elongated resonator conductors positioned on a dielectric substrate which is backed by a ground plane conductor, with the response frequency being dependent primarily on the length of the resonator. A wide apron conductor is connected to the grounded end of the resonator and to the ground planes. The resonator and apron can be formed by use of a mask such that errors in alignment of the mask do not change the length of the resonator or the point of connection to the grounding apron. The apron, because of its width, has low transmission line impedance to the ground plane which is not changed by changes in configuration or position of the mask, so that it effectively grounds the resonator at the end thereof connected to the apron. A second dielectric substrate backed by a ground plane conductor may be placed on the resonator conductor. The filter may have a plurality of resonators connected to grounding aprons, and a plurality of resonators can be connected to the same apron. In this case it may be desired to place a notch or cut-out in the apron between the connection of the resonators thereto, to interrupt spurious couplings between such resonators through the apron.

24 Claims, 4 Drawing Figures

STRIPLINE FILTER DEVICE

Matter enclosed in heavy brackets [ ] appears in the original patent but forms no part of this reissue specification; matter printed in italics indicates the additions made by reissue.

BACKGROUND OF THE INVENTION

Stripline, microstrip and other transmission line type filters have been used in electronic devices to provide inexpensive filters which are of small size. In such filters, the frequency response depends upon the configuration of the conducting resonator and the shape and dielectric constant of the surrounding materials. In small devices for use at very high frequencies, such as 800 MHz, the length of the resonator is quite critical, and variations in the length of the resonator and the dimensions of the dielectric substrate on which it is placed resulting manufacturing tolerances can result in changes in the frequency response so that the response of the completed filter will not fall within acceptable limits. In particular, stripline filters constructed by known thin film processes may have variations in the resonator configuration resulting from errors in alignment of the mask used in forming the resonator, which result in unsatisfactory frequency responses.

The use of external devices for adjusting the frequency response of filters is known, such as trimming screws and capacitors, but these devices substantially increase the size and cost of the filters. It has also been proposed to adjust components of the filter after it is constructed and tested, but this requires further processing steps. These various adjusting devices and techniques have not been entirely satisfactory in many applications.

SUMMARY OF THE INVENTION

It is an object of this invention to provide an improved transmission line type resonant device which is of compact and inexpensive construction, and wherein the frequency response can be closely held to specified limits.

Another object of the invention is to provide an improved transmission line type filter wherein the length of the conducting resonator, and the point of connection thereof to the ground plane of the filter are accurately determined.

A further object is to provide a stripline filter having a conductor formed on a substrate which has an elongated resonator portion and a grounding portion, wherein the length of the resonator portion and the junction thereof with the grounding portion are precisely controlled during the construction.

Still another object of the invention is to provide a multiresonator interdigital stripline filter having a dielectric substrate with a conducting ground plane on one side, and conductors on the opposite side forming a plurality of resonators each having a conducting apron connected to one end thereof, and wherein the aprons are connected to the ground plane and have low transmission line impedance therewith.

A still further object is to provide a multiple resonator filter including a plurality of resonators which are connected to a grounding apron, with a cut-out portion in the apron between the connection of the resonators thereto to reduce spurious couplings through the apron from one resonator to another.

The stripline filter of the invention has a resonant conducting structure placed on a dielectric substrate which has a ground plane conductor on the opposite (back) side. A second dielectric substrate may be positioned on the conducting structure with a ground plane conductor on its opposite (top) side. The substrates can be secured together by adhesive to form a sealed unit. The resonant conducting structure includes one or more elongated resonator conductors having a wide apron portion at one end which is connected to the ground plane conductors. The conducting structure can be provided in many different known ways, as by thin film and thick film conductors applied to the substrate or by the use of a separate conductive layer. The configuration of the resonator conductor and the junction thereof with the conducting apron can be accurately controlled. Because of its width, the apron has a low transmission line impedance to the ground plane so that the junction of the resonator conductor therewith is effectively at ground potential, and the frequency response is dependent only on the configuration of the resonator and not on its alignment with respect to the substrate. A plurality of resonators can be used to form a multi-element filter, with each having an apron to provide accurate frequency response, as stated. A plurality of resonator conductors can be connected to the same apron in a multi-element filter, and in such case, it may be desired to provide a notch or cut-out in the apron between the connections of the resonators thereto to reduce the spurious couplings which may extend from one resonator to the other through the apron. The apron may be divided into a plurality of sections to reduce the spurious couplings, with all the apron sections being substantially at ground potential so that the resonators act to provide the desired frequency response.

DETAILED DESCRIPTION

Figure 1:
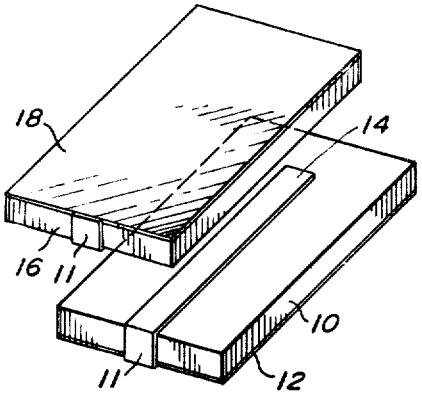
Fig. 1 PRIOR ART
FIG. 1 illustrates a prior art stripline device.

FIG. 1 shows a stripline device of known construction. This includes a dielectric substrate 10 having a ground plane conductor 12 on the bottom side and an elongated resonator conductor 14 on the top side. A second substrate 16 may be placed on the conductor 14, which also has a ground plane conductor 18 on its top side. The structure can be assembled by use of adhesive material between the substrates to form a sealed unit. The conductor 14 forms a resonator, with the frequency of response depending on the length of this conductor and on the dielectric constant and configuration of the substrates. One end of the resonator conductor 14 is connected to the ground plane conductors 12 and 18, as by conductors 11 extending about the edges of the substrates 10 and 16. Alternatively, conductors can be provided through openings in the substrates, as is well known.

The structure of FIG. 1 has been found to have the disadvantage that it is difficult to position the conductor 14 accurately on the substrate 10, so that the effective length thereof is precisely accurate to provide the desired frequency response. When the conductor 14 is provided on the substrate 10 by known thin film processes, the mask used in forming the pattern of the conductor may not be accurately aligned on the substrate, and the connection of the conductor 14 to the ground plane will be different in various instances. This results in different effective lengths for the resonator, and different dielectric lengths between the resonator and the ground plane. Accordingly, the structures produced will have responses at different frequencies.

Figure 2:
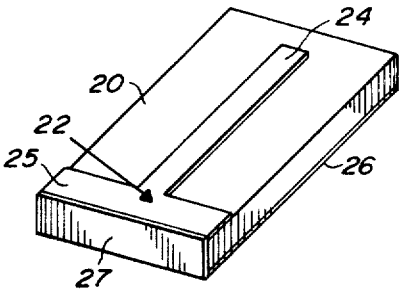
FIG. 2 shows a stripline resonant device in accordance with the invention.

FIG. 2 illustrates a stripline or transmission line resonator device in accordance with the invention. In this device, a dielectric substrate 20 has a conductor 22 formed thereon, with an elongated resonator 24 and a wide apron 25 formed as an integral conductor. The length of the resonator 24 in the structure of FIG. 2 controls the frequency of response of the stripline device, as the length of the conductor 14 controls the frequency of response in the structure of FIG. 1. However, as the resonator 24 and apron are formed as a single conductor, the length of the resonator 24 and the point of connection thereof to the conducting apron 25 can be very accurately determined.

The conducting apron portion 25 of the conductor 22 is electrically connected to the ground plane conductor 26 on substrate 20 by a conducting bridge 27 which extends about one end of the substrate 20, as shown in FIG. 2. As the apron portion 25 is relatively wide, the transmission line impedance between this portion and the ground plane 26 is very low so that the entire apron portion is effectively at ground potential. Accordingly, both the length of the resonator 24 and the point of connection thereof to ground are accurately determined. The device of FIG. 2 will preferably have a second dielectric substrate above the conductor 22, with a ground plane conductor thereon. This can be the same as substrate 16 and conductor 18 shown in FIG. 1. The conductor 18 will also be electrically connected to the conductor 22, and particularly to the conducting apron 25 thereof.

Figure 3:
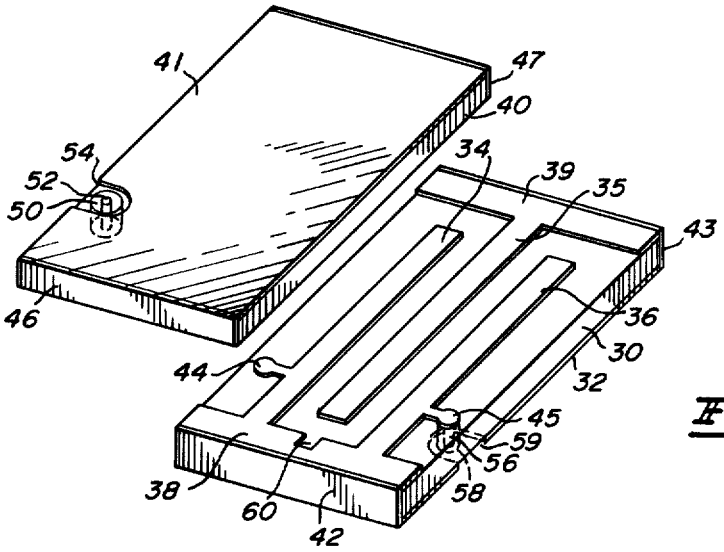
FIG. 3 illustrates a multi-element stripline filter in accordance with the invention.

FIG. 3 illustrates the use of the invention in a three resonator interdigital edge coupled bandpass filter. This filter can be used in many applications, such as for the preselector of a very high frequency radio device. The filter illustrated is suitable for use in the 800 MHz frequency band, but it is pointed out that filters constructed in accordance with the invention can be used in many different applications at different frequencies, and can have different filter configurations with more or less than three resonators.

In FIG. 3, the substrate 30 may be made of ceramic, such as alumina, and may have a thickness of the order of 0.03 inch. The ground plane conductor 32 on the bottom surface of the substrate 30 can be an electroplated copper layer. On the top surface of substrate 30 is formed a multi-part conductor including resonators 34, 35 and 36, and relatively wide apron conductors 38 and 39. The resonators 34 and 36 each have an end integrally joined to apron 38, and the resonator 35 has its opposite end joined to apron 39. The resonators and aprons can all be formed by a single thin film process which is known in the art. The ceramic substrate may be provided with a plurality of other substrates as a single piece of ceramic material, with scribe lines on the material to facilitate breaking the same into individual substrates.

Although other processes can be used, in one thin film process which has been successfully used, the entire piece of ceramic has a titanium layer evaporated thereon, followed by an evaporated copper layer. A photoresist is then applied which is exposed through a mask aligned to the ceramic material to define the pattern of conductors 34, 35, 36, 38 and 39. The photoresist is developed leaving exposed copper areas which are plated with copper and then with gold to provide the desired conductive characteristics. The photoresist is then stripped and the copper layer thereunder is etched away, with the gold layer protecting the desired conductors.

As stated in connection with FIG. 2, the aprons 38 and 39, because of their widths will have low impedance to the ground plane conductor 32, and the aprons are directly electrically connected to the ground plane conductor 32 by plated conductors 42 and 43 on the ends of the substrate 30, or other suitable known connections. The filter of FIG. 3 has a cover formed by substrate 40 which has a ground plane conductor 41 thereon. The substrate 40 can be secured to the substrate 30 and the conductors thereon, as by use of an adhesive layer and the application of heat and pressure, to provide a sealed filter unit. The aprons 38 and 39 can also be connected to the ground plane conductor 41 by use of conductors 46 and 47, like the conductors 42 and 43 which connect the aprons 38 and 39 to the ground plane conductor 32. A solder bridge can be used to connect the seam between conductors 42 and 46 at one end of the unit, and to the conductors 43 and 47 at the other end, when the substrates are secured together. The aprons 38 and 39 will have low impedance to the top ground plane conductor 41, just as to conductor 32. Although tolerances in the substrates, and in the alignment of the mask therewith during the thin film process may result in errors in positioning the aprons with respect to the edges of the substrates, and the solder connections thereto may differ slightly to change the dielectric length, this will not significantly change the response frequency, as the lengths of the resonators and the points of connection thereof to the effective ground plane are accurately determined.

FIG. 3 also illustrates the input and output connections to the stripline filter. Conducting extensions 44 and 45 connected to the resonators 34 and 36, respectively, may be formed by the thin film process. Extension 44 can be the input coupling to the filter and apply signals to resonator 34. The signals are edge coupled from resonator 34 to resonator 35, and from resonator 35 to resonator 36, with the filtered output being derived from resonator 36 at the extension 45. A connection is made through the top substrate 40 by conductor 52 which extends through an opening 50 in the substrate to make electrical connection with the extension 44. The opening 50 is large enough for the input conductor 52 to extend therethrough to engage the extension 44. The top ground plane conductor 41 has a notch 54 providing clearance for the input conductor 52. The output from extension 45 is provided by conductor 56 which extends through an opening 58 in the base substrate 30 and may form the output terminal. A notch 59 is provided in the bottom ground plane conductor 32 providing clearance for this terminal. It will be apparent that the filter may be symmetrical and either terminal can be the input terminal and the other terminal will then be the output terminal.

In a filter as illustrated in FIG. 3, it has been found that couplings through the apron 38 from the input resonator 34 to the output resonator 36 may provide spurious responses in the filter output. Although the apron 38 is effectively at ground potential, it is not so directly tied to ground that signals cannot be coupled therethrough. To reduce such spurious response, a cut-out notch 60 is cut in the apron 38, as shown by FIG. 3. This cut-out may extend only partly through the apron 38 as shown, or may be all the way across the apron to separate the apron into two sections. If the apron is completely separated, each section thereof will be at ground potential because of the connections to the ground plane, and also because of the low transmission line impedances to the two ground plane conductors. Accordingly, the ends of the resonators connected to the aprons will be effectively at ground potential as has been described.

Figure 4:
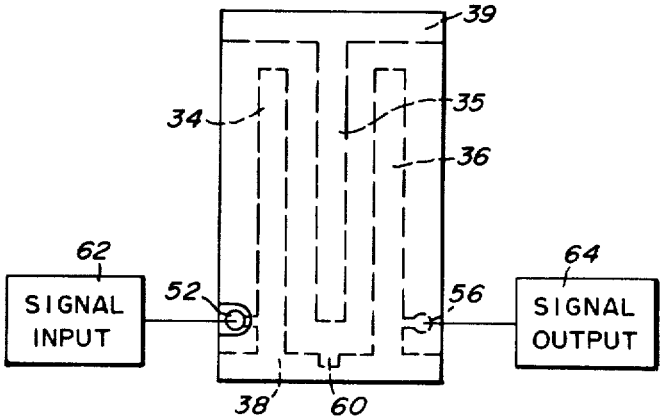
FIG. 4 shows the use of the filter of FIG. 3 in a representative application.

FIG. 4 illustrates the application of the filter to receive signals from a signal input device 62 which is connected to the filter input terminal 52, and to apply filtered signals from the filter output terminal 56 to a signal device 64 which utilizes the signal output. The filter is quite small so that it is quite suitable for use in a miniature device such as a paging receiver to filter the received R.F. signal. That is, the filter can be used as the preselector for the paging receiver, or in a similar application. For operation in the 800 MHz frequency band, the three resonator filter described can have dimensions of the order of 1.4 inches long, 0.5 inch wide, and 0.1 inch thick.

As previously stated, the improved construction described is suitable for use in transmission line resonator devices of various types, such as stripline and microstrip filters. The conductor forming the resonator and apron can be provided by a thin film process as described, by known thick film processes such as one using glass impregnated conductive ink silk screened on the substrate, by use of a separate conductive sheet cut to the desired shape, or by any other known means. In any such construction, the apron connected to the resonator will effectively ground the same at a precisely determined point to provide a device having a highly accurate frequency response.

We claim:

1. An improved transmission line resonator device, adapted for use in a predetermined frequency band, wherein the effects of mask misalignment during manufacture are minimized, including in combination, a dielectric substrate having a conducting layer formed on one side thereof as a ground plane, a thin film conductor structure formed on said substrate on the side thereof opposite to said ground plane layer which includes at least one elongated relative narrow resonator portion having a length related to the predetermined frequency but less than the length of said dielectric substrate, and a relatively wide grounding portion connected to said resonator portion at one end thereof, and electrical means connecting said grounding portion to said ground plane conducting layer.

2. A device in accordance with claim 1 wherein said conductor structure includes a plurality of elongated resonator portions extending in substantially parallel spaced relation, with each of said resonator portions having one end thereof connected to said grounding portion.

3. A device in accordance with claim 2 wherein said grounding portion has a cut-out portion therein at a point between the connections of said resonator portions thereto to reduce the coupling therebetween.

4. A device in accordance with claim 2 wherein said conductor structure has a further resonator portion positioned between a pair of said plurality of resonator portions, and a further grounding portion spaced from said first named grounding portion and connected to said further resonator portion at one end thereof, and wherein said electrical means connects said further grounding portion to said ground plane conducting layer.

5. A device in accordance with claim 1 wherein said conductor structure includes a plurality of elongated resonator portions extending in substantially parallel relation, and a plurality of relatively wide grounding portions each connected to one of said resonator portions at one end thereof, and wherein said electrical means connects all of said grounding portions to said ground plane conducting layer.

6. A device in accordance with claim 1 including a further dielectric substrate have one side thereof positioned against said conductor structure, and a ground plane conducting layer on said further substrate on the side thereof opposite to said one side, and wherein said electrical means connects said grounding portion of said conductor structure to said ground plane conducting layer on said further substrate.

7. An improved stripline filter, adapted for use in a predetermined frequency band, wherein the effects of mask misalignment during manufacture are minimized, including in combination, a first dielectric substrate having a ground plane conducting coating formed on one side thereof, a thin film conductor structure formed on the side of said substrate opposite to said one side including an elongated relatively narrow conductive resonator having a predetermined length less than the length of said substrate and a relatively wide conductive apron connected to said resonator at one end thereof, a second dielectric substrate having one side positioned against said conductor structure and a ground plane conducting coating formed on the side of said substrate opposite said one side, and means electrically connecting said conductive apron to said ground plane conducting coatings.

8. A filter in accordance with claim 7 wherein said conductor structure includes a plurality of substantially parallel spaced conductive resonators, each having one end thereof connected to said conductive apron.

9. A filter in accordance with claim 8 wherein said conductive apron has a cut-out portion therein intermediate the connections of said resonators thereto to reduce coupling of signals through said apron from one of said resonators to another resonator.

10. A filter in accordance with claim 7 wherein said conductor structure includes first and second conductive aprons, and first and second substantially parallel elongated conductive resonators connected to said first conductive apron, and a third elongated conductive resonator positioned between said first and second resonators and connected to said second conductive apron, said third resonator being in substantially parallel spaced relation to said first and second resonators.

11. A filter in accordance with claim 10 wherein said first conductive apron has a cut-out portion therein intermediate the connections of said first and second resonators thereto.

12. A filter in accordance with claim 10 wherein said conductor structure includes a first conductive extension connected to said first resonator for applying signals thereto, and a second conductive extension connected to said second resonator for deriving signals therefrom, and further including a first conductor extending through one of said first and second substrates connected to said first conductive extension, and a second conductor extending through one of said first and second substrate connected to said second conductive extension.

*13. An improved transmission line resonator device, adapted for use in a predetermined frequency band, wherein the effects of mask misalignment during manufacture are minimized, including in combination,*

*a dielectric substrate having a conducting layer formed on one side thereof as a ground plane,*

*a conductor structure formed on said substrate on the side thereof opposite to said ground plane layer which includes at least one elongated relative narrow resonator portion having a length related to the predetermined frequency but less than the length of said dielectric substrate, and a relatively wide grounding portion connected to said resonator portion at one end thereof, and*

*electrical means connecting said grounding portion to said ground plane conducting layer.*

*14. A device in accordance with claim 13 wherein said conductor structure includes a plurality of elongated resonator portions extending in substantially parallel spaced relation, with each of said resonator portions having one end thereof connected to said grounding portion.*

*15. A device in accordance with claim 14 wherein said grounding portion has a cut-out portion therein at a point between the connections of said resonator portions thereto to reduce the coupling therebetween.*

*16. A device in accordance with claim 14 wherein said conductor structure has a further resonator portion positioned between a pair of said plurality of resonator portions, and a further grounding portion spaced from said first named grounding portion at one end thereof, and wherein said electrical means connects said further grounding portion to said ground plane conducting layer.*

*17. A device in accordance with claim 13 wherein said conductor structure includes a plurality of elongated resonator portions extending in substantially parallel relation, and a plurality of relatively wide grounding portions each connected to one of said resonator portions at one end thereof, and wherein said electrical means connects all of said grounding portions to said ground plane conducting layer.*

*18. A device in accordance with claim 13 including a further dielectric substrate having one side thereof positioned against said conductor structure, and a ground plane conducting layer on said further substrate on the side thereof opposite to said one side, and wherein said electrical means connects said grounding portion of said conductor structure to said ground plane conducting layer on said further substrate.*

*19. An improved stripline filter, adapted for use in a predetermined frequency band, wherein the effects of mask misalignment during manufacture are minimized, including in combination,*

*a first dielectric substrate having a ground plane conducting coating formed on one side thereof,*

*a conductor structure formed on the side of said substrate opposite to said one side including an elongated relatively narrow conductive resonator having a predetermined length less than the length of said substrate and a relatively wide conductive apron connected to said resonator at one end thereof,*

*a second dielectric substrate having one side positioned against said conductor structure and a ground plane conducting coating formed on the side of said substrate opposite said one side, and*

*means electrically connecting said conductive apron to said ground plane conducting coatings.*

*20. A filter in accordance with claim 19 wherein said conductor structure includes a plurality of substantially parallel spaced conductive resonators, each having one end thereof connected to said conductive apron.*

*21. A filter in accordance with claim 20 wherein said conductive apron has a cut-out portion therein intermediate the connections of said resonators thereto to reduce coupling of signals through said apron from one of said resonators to another resonator.*

*22. A filter in accordance with claim 19 wherein said conductor structure includes first and second conductive aprons, and first and second substantially parallel elongated conductive resonators connected to said first conductive apron, and a third elongated conductive resonator positioned between said first and second resonators and connected to said second conductive apron, said third resonator being in substantially parallel spaced relation to said first and second resonators.*

*23. A filter in accordance with claim 22 wherein said first conductive apron has a cut-out portion therein intermediate the connections of said first and second resonators thereto.*

*24. A filter in accordance with claim 22 wherein said conductor structure includes a first conductive extension connected to said first resonator for applying signals thereto, and a second conductive extension connected to said second resonator for deriving signals therefrom, and further including a first conductor extending through one of said first and second substrates connected to said first conductive extension, and a second conductor extending through one of said first and second substrate connected to said second conductive extension.*

* * * * *

UNITED STATES PATENT AND TRADEMARK OFFICE

CERTIFICATE OF CORRECTION

PATENT NO. : Re. 31,470

DATED : December 20, 1983

INVENTOR(S) : Brian E. Bedard
Bertho K. Boman

It is certified that error appears in the above-identified patent and that said Letters Patent is hereby corrected as shown below:

In column 6, line 23 (Claim 6), delete "have" and insert --having--.

In column 7, line 43 (Claim 16), after "portion", insert --and connected to said further resonator portion--.

Signed and Sealed this

*Thirtieth* Day of *October 1984*

[SEAL]

*Attest:*

GERALD J. MOSSINGHOFF

*Attesting Officer*

*Commissioner of Patents and Trademarks*